United States Patent [19]

Naruse et al.

[11] Patent Number: 4,598,207

[45] Date of Patent: Jul. 1, 1986

[54] STORAGE AND RECONSTRUCTION APPARATUS FOR RADIATION IMAGE

[75] Inventors: Yujiro Naruse, Yokohama; Shunji Shirouzu, Ayasa, both of Japan

[73] Assignee: Tokyo Shibaura Denki Kabushiki Kaisha, Kawasaki, Japan

[21] Appl. No.: 526,465

[22] Filed: Aug. 25, 1983

[30] Foreign Application Priority Data

Aug. 25, 1982 [JP] Japan ................................ 57-147057
Dec. 9, 1982 [JP] Japan ................................ 57-214612

[51] Int. Cl.⁴ ........................................... H05B 33/00
[52] U.S. Cl. ............................. 250/484.1; 350/327.2
[58] Field of Search ................... 250/484.1, 327.2; 346/110 R, 110 V; 252/301.4 P, 301.4 F

[56] References Cited

U.S. PATENT DOCUMENTS

| | | | |
|---|---|---|---|
| 2,270,124 | 1/1942 | Hüniger et al. | 252/301.4 P |
| 3,740,241 | 6/1973 | Brömer et al. | 250/301.4 P |
| 3,743,412 | 7/1973 | Morse | 346/110 R |
| 4,003,651 | 1/1977 | Hashida et al. | 346/110 R |
| 4,259,587 | 3/1981 | Takahashi et al. | 250/486.1 |
| 4,400,619 | 8/1983 | Kotera et al. | 250/327.2 |
| 4,484,203 | 11/1984 | Booth et al. | 346/110 V |

Primary Examiner—Carolyn E. Fields
Assistant Examiner—Richard Hanig
Attorney, Agent, or Firm—Oblon, Fisher, Spivak, McClelland & Maier

[57] ABSTRACT

A storage and reconstruction apparatus for radiation image is comprised of a radiation image storage medium made of phosphor glass powder in which activators are formed according a radiation image. The radiation image storage medium emits a fluorescent light by irradiation of an excitation light, and the emitted fluorescent light is detected and converted into an electrical signal. The electrical signal is treated by an image processor and the radiation image is reconstructed.

14 Claims, 9 Drawing Figures

STORAGE AND RECONSTRUCTION APPARATUS FOR RADIATION IMAGE

BACKGROUND OF THE INVENTION

1. Field of the Invention

The present invention relates to an apparatus for storage and reconstruction of a radiation image, and more particularly to an apparatus for storage of a two-dimensional radiation image using a phosphor plate and for reconstruction of a stored radiation image.

2. Description of the Prior Art

A method for observing a radiation image of an object by using a radiation such as X-ray, α-ray, β-ray and γ-ray is commonly used in the field of a medical diagnosis or for non-destructive inspection.

In general, a silver halide-based film is utilized as a radiation image storage medium. Nevertheless, a new apparatus is being developed in order to conserve silver and to digitize an image signal.

A typical prior art method is as follows;

In storage stage, an X-ray emitted from an X-ray source is irradiated to an object such as a human body, and a transmitted radiation image is stored in an image storage phosphor plate. The image storage phosphor plate is made of a silver-activated Barium fluoro halide. Entering the X-ray into the image storage phosphor plate, active are formed in the phosphor plate according to an X-ray image.

In a reconstruction stage, a laser beam from a He-Ne laser (wavelength: 633 nm) or a He-Cd laser (wavelength: 325 nm) is deflected by a deflector, and the phosphor plate is scanned by the deflected laser beam. The phosphor plate is simultaneously moved in a direction orthogonal to the scanning direction. Consequently, a flourescent light, the intensity of which corresponds to the irradiated X-ray, is emitted from the phosphor plate. The flourescent light is collected by a light collecting sheet which is made of an acrylic resin, which is then fed to a photo multiplier. A current signal obtained from the photo multiplier is digitized in a data processing device, and, after a desired image treatment is carried out, a radiation image is displayed by an image display device. Several image processing methods are well known. One of the typical methods is a so-called pulse image mode processing, in which a plurality of subtraction images are formed synchronously with the pulsed X-ray exposure, with one image then being formed by adding each substraction image. Other methods such as a so-called continuous mode processing and a time interval difference mode processing are also well known.

However, these prior art methods have several disadvantages.

A fluorescent light emitted from a radiation image storage medium by the scanning laser beam has both a light component which is collected by the light collecting sheet and a light component wich is transmitted in the medium and is not collected by the light collecting sheet. In a silver halide-based radiation image storage medium, the light component which is transmitted and is not collected by the light collecting sheet is more than fifty percent of the total light. Therefore, the amount of light collected by the light collecting means is small, and thus the output signal from the photo multiplier is also reduced, and the quality of the reconstructed radiation image is degraded. In order to avoid this problem, the intensity of the radiation which is irradiated to the object must be increased.

However, increase in radiation intensity has harmful effect upon the human body, and likewise is a problem for the system itself.

In the prior art, it is also difficult to reduce the necessary time period for reconstruction of the radiation image, because a mechanical scanning means such as the deflector and a mechanism for moving the radiation image storage medium are used when the light excitation is carried out against the radiation image storage medium to reconstruct the radiation image.

Furthermore, for the same reason, an instantaneous image processing is difficult, because the radiation image storage medium must be set up to the attached reconstruction apparatus after the radiation image is stored in the medium.

SUMMARY OF THE INVENTION

Accordingly, an object of the present invention is to provide a new and improved storage and reconstruction apparatus for radiation image which may increase the light collecting efficiency from the radiation image storage medium, and results in a high quality reconstructed image.

Another object of the present invention is to provide a new and improved storage and reconstruction apparatus for radiation image which is able to shorten the necessary time period from the storage stage to a reconstruction stage without using mechanical scanning.

According to the present invention, there is provided a storage and reconstruction apparatus for radiation image having a radiation source and a radiation image storage medium made of phosphor glass powder in which active sites are formed corresponding to a radiation image by irradiating a radiation from the radiation source through an object. A light beam irradiation device provides a light beam having an effective wavelength for light excitation of the radiation image storage medium, and also scans the radiation image storage medium. Fluorescent light emitted from the radiation image storage medium is detected, and a device reconstructs the radiation image by processing an output signal from the light detector.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
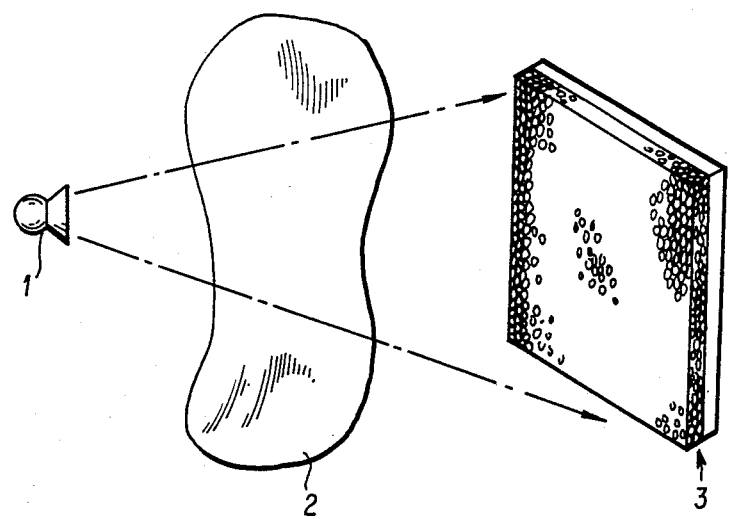
FIG. 1 is a schematic view showing the radiation image storage stage according to the present invention.

Referring now to the drawings, wherein like reference numerals designate identical or corresponding parts throughout the several views, and more particularly to FIG. 1 thereof, which illustrates the radiation image storage stage according to the present invention.

An X-ray from an X-ray tube 1 irradiates an object 2, such as a human body, for example. Then a transmitted X-ray irradiates a radiation image storage medium 3, with active sites corresponding to the entered X-ray formed in the medium 3.

Figure 2:
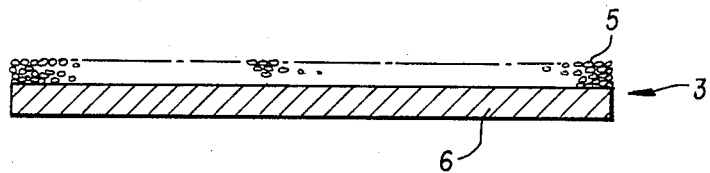
FIG. 2 is a sectional view of the radiation image storage medium shown in FIG. 1.

The radiation image storage medium 3 is, as shown in FIG. 2, constructed by using phosphor glass powder 5 which is deposited in a plurality of layers fashioned on a substrate 6. The substrate 6 is made of Ni metal plate which has approximately the same coefficient of expansion as that of the phosphor glass powder 5. A representative size of the medium 3 is 20 cm × 30 cm with the Ni plate 6 being approximately 1 mm thick. The total thickness of the phosphor glass powder layer is preferably limited to 1 mm or less, in order to obtain a high emission efficiency of the fluorescent light. Furthermore, the diameter of the glass power 5 is between 5 μm and 500 μm, and preferably, between 10 μm and 100 μm. The reason for this powder size restriction is that if diameter of the glass powder is larger than 500 μm, a satisfactory resolution can not be obtained, and if the diameter is smaller than 5 μm, then the light collecting efficiency is decreased even though the resolution is high.

In the embodiment shown in FIG. 2, the total thickness of the glass powder layer is approximately 0.5 mm, and the diameter of the glass powder is 44 μm. It should be noted here that the shape of each particle of powder glass is not limited to a sphere, and the term "diameter" denotes an average diameter.

Figure 3:
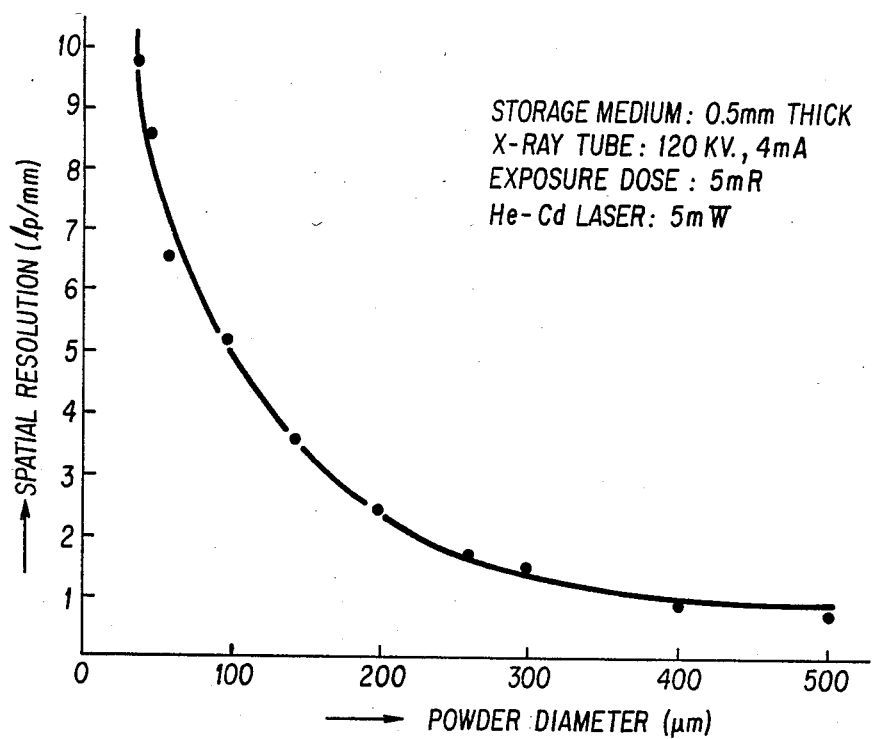
FIG. 3 shows the relationship between the powder diameter and the spatial resolution.

FIG. 3 shows the relationship between the diameter of powder glass and the resolution. In this figure, dimension 1 p/mm of the resolution represents number of line pairs per 1 mm. The data shown in this figure have been taken under the conditions that the total thickness of the glass powder layer is 0.5 mm, the X-ray tube voltage is 120 KV, the X-ray tube current is 4 mA, the exposure dose is 5 mR, and the output power of the He-Cd laser is 5 mW.

The phosphor glass powder 5 has the compositions shown by the example in Table 1. Each composition in Table 1 is represented by weight percent. In these compositions, Ag, P and O are essential. As shown in Example No. 2, Ba may be added in order to increase the so-called stopping power against radiation, and to make the radiation image storage medium thin.

One example of manufacturing the image storage medium 3 is that 150 grams of butyl acetate and 50 grams of poly vinyl butyral per 100 grams of phosphor glass powder are mixed together, and this mixture is then applied on the Ni metal plate 6 by spraying.

TABLE 1

| Comp. | Ex. No. | | | | | | |
|---|---|---|---|---|---|---|---|
| | 1 | 2 | 3 | 4 | 5 | 6 | 7 |
| Ag | 3.7 | 7.4 | 3.3 | 4.8 | 0.5 | 1.4 | 0.2 |
| P | 33.4 | 27.2 | 34.5 | 34.0 | 33.1 | 33.2 | 31.6 |
| O | 53.7 | 42.2 | 53.5 | 52.7 | 51.3 | 51.4 | 51.1 |
| Li | 3.7 | — | 3.6 | 3.5 | — | — | — |
| Al | 4.7 | 4.7 | 5.1 | 5.0 | 6.1 | 5.5 | 6.1 |
| Na | — | — | — | — | 9.0 | 6.6 | 11.0 |
| Mg | — | — | — | — | — | 1.9 | — |
| B | 0.8 | — | — | — | — | — | — |
| Ba | — | 10.8 | — | — | — | — | — |

Figure 4:
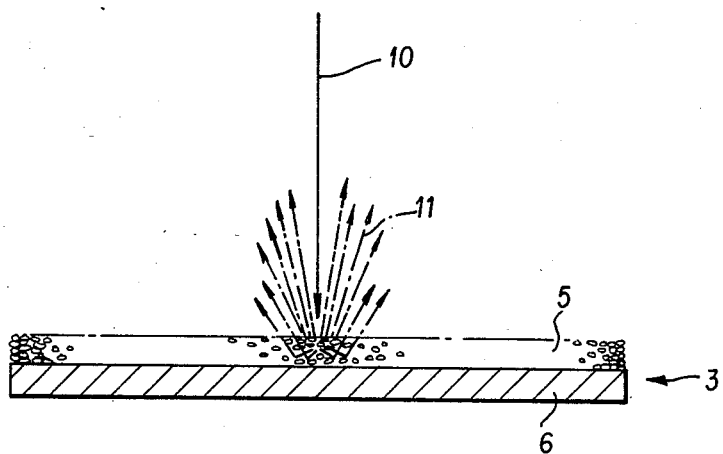
FIG. 4 is a schematic view showing emission of the fluorescent light from the radiation image storage medium when a light beam which excites the medium is irradiated.

FIG. 4 shows the emission of the fluorescent light from the radiation image storage medium 3 in which the radiation image is stored, by irradiation of an excitation light.

In FIG. 4, reference numeral 10 designates an excitation light. When the excitation light 10 irradiates the medium 3, a fluorescent light 11 is emitted from the medium 3, and the light 11 is then detected by a light detector (not shown). The wavelength of the emitted light 11 is between 500 nm and 700 nm.

In this example, the light component which is transmitted in the medium 3 and is not collected by the light detector is less than 10 percent, because the emitted light in the medium 3 is scattered by the glass powder 5, and thus substantially all light becomes a component which is collected by the light detector. Therefore, according to the image storage medium 3 of the present invention, the light collecting efficiency is high which leads to a marked improvement in the reconstructed radiation image.

Figure 5A:
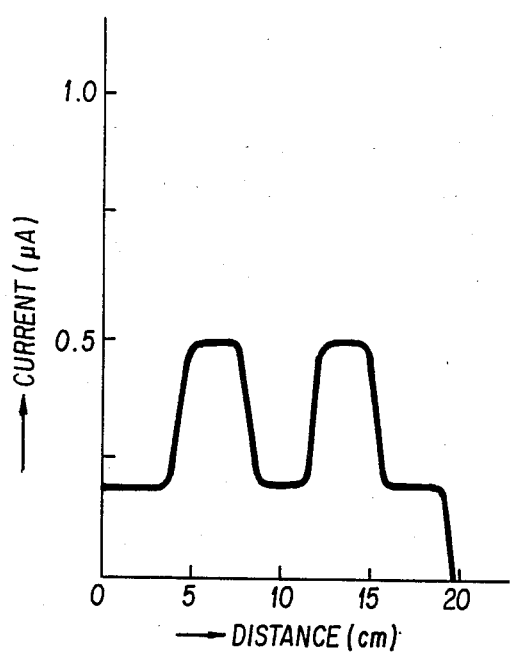
FIGS. 5a and 5b show light detecting characteristics of the conventional storage medium and of the storage medium according to the present invention, respectively.
Figure 5B:
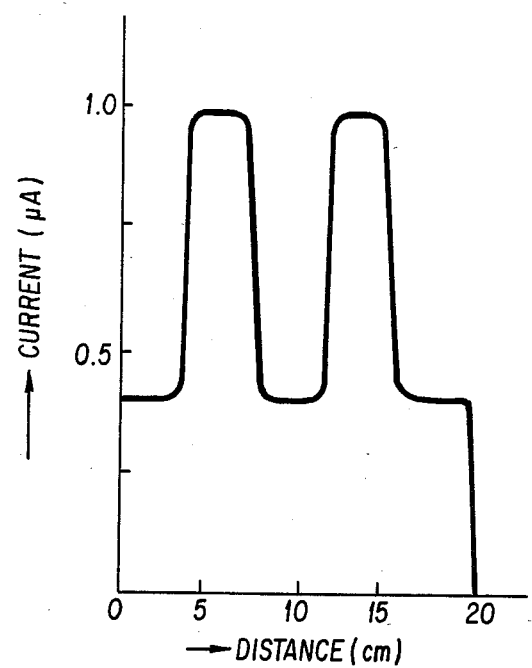

FIG. 5a shows the light detecting characteristics according to the conventional storage medium and FIG. 5b shows the light detecting characteristics according to the storage medium of the present invention.

In these figures, the ordinate and the abscissa represent the output current of the light detector and the distance in the medium, i.e. scanning beam location, respectively. Furthermore, in both figures, the conditions of the experiment are the same, namely, the same as those decribed in FIG. 3.

As apparent from FIGS. 5a and 5b, the light detector output signal according to the present invention is approximately twice the amplitude of that obtained from the conventional storage medium.

Figure 6:
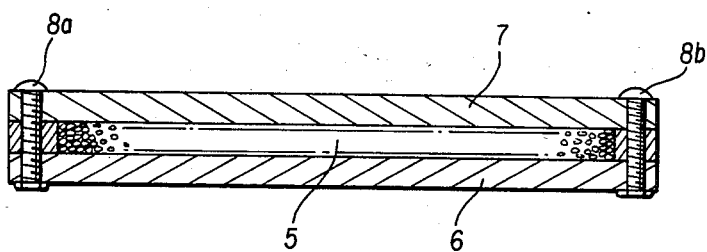
FIG. 6 is a sectional view of another embodiment of the radiation image storge medium.

The radiation image storage medium shown in FIG. 2 is manufactured by the binding method using chemical solution. The method for making the medium of the present invention is not, however, limited to the binding method. FIG. 6 shows another embodiment of the medium of the present invention. The phosphor glass powder 5 shown in this figure is fixed by insertion between the Ni metal plate 6 and the transparent glass plate 7. Preferably screws 8a, 8b are used to fix the pack including the plate 7 and 6 together. According to this embodiment, insertion and removal of the glass powder is easily carried out, and therefore, a reciprocation of the glass powder is possible, leading to a short manufacturing time.

As described above, in the storage and reconstruction apparatus acording to the present invention, a radiation image storage medium is made of phosphor glass powder. Therefore, the light component which is not collected under the conventional medium, is able to be changed to a component which is collected by the detector, according to the present invention. Consequently, light collection efficiency is improved, and the quality of the reconstructed picture is also improved. In other words, the intensity of the radiation can be reduced in comparison with the conventional apparatus, and therefore, radiation effects on humans and construction requirements for producing system can be minimized.

Figure 7:
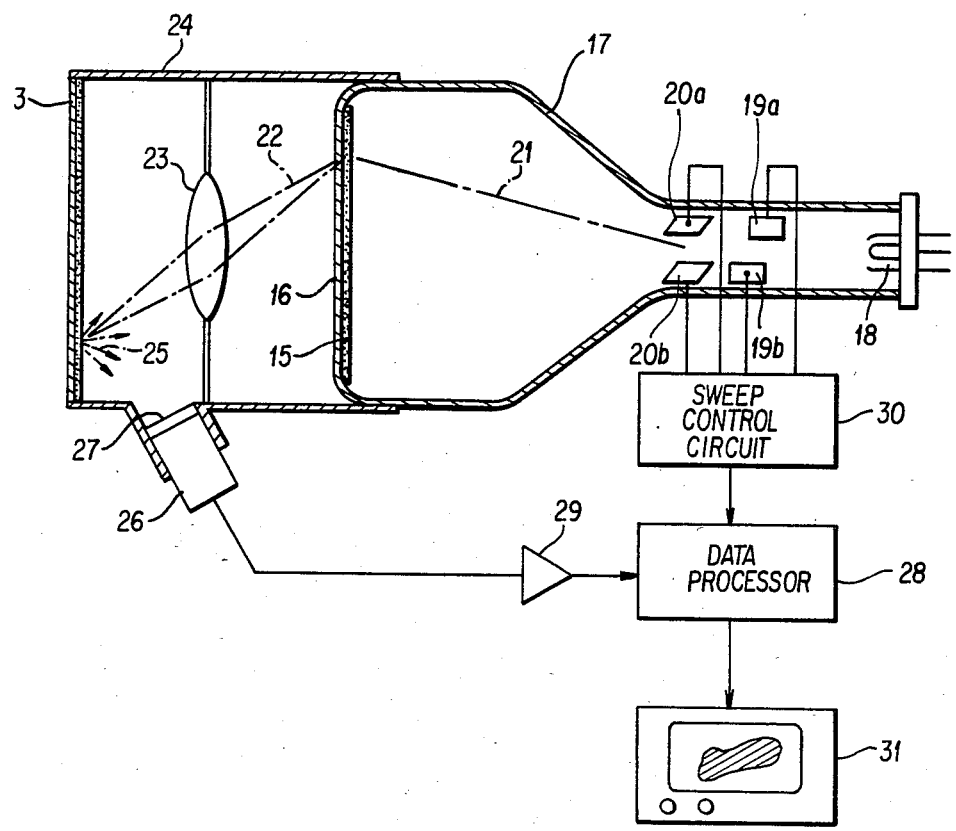
FIG. 7 is a schematic view showing the reconstruction stage of the radiation image according to the present invention.

FIG. 7 is a schematic view showing the reconstruction stage of the radiation image according to the present invention.

In FIG. 7, reference numeral 3 represents the radiation image storage medium shown in FIG. 2. The radiation image is already stored in the medium 3. At the rear of the medium 3, a phosphor film 15 is arranged. The phosphor film 15 is formed inside of a face plate 16 of a vacuum tube 17. In the vaccum tube 17, an electron gun 18, a pair of horizontal deflection electrodes 19a and 19b, and a pair of vertical deflection electrodes 20a and 20b are deposited. These deflection electrodes 19a, 19b, and 20a and 20b deflect an electron beam 21. Thus, the vacuum tube 17 is effectively a cathode ray tube.

The phosphor film 15 emits fluorescent light 22 by the electron beam scanning. The light 22 emitted from the phosphor film 15 has a wavelength component which is effective to excite the radiation image storage medium 3. One example of the phosphor film 15 is a film having $Ca_2Mg\ Si_2O_7[Ge]$ as a main composition with the wavelength of the light emitted from this film being approximately 360 nm.

An optical lens 23 is arranged between the phosphor film 15 and the medium 3. The optical lens 23 condenses the excitation light 22 emitted from the phosphor film 15 on the medium 3. The medium 3 is scanned and excited, in order, by the condensed light.

Reference numeral 24 denotes a supporting structure which supports the medium 3, the optical lens 23, and a photo multiplier 26.

The excited medium 3 emits a fluorescent light 25 corresponding to the stored radiation image, and the light 25 is detected by the photo multiplier 26 through an optical filter 27. The optical filter 27 selectively passes a light having wavelength between 500 nm and 700 nm. Therefore, the excitation light 22 from the phosphor film 15 is prevented from passing through the filter 27 with only the light from the medium 3 being detected by the photo multiplier 26.

The photo multiplier 26 converts a light signal into an electrical signal, and the output signal of the multiplier 26 is fed to a data processor 28 through an amplifier 29. The data processor 28 processes an input radiation image, data, and reconstructs the radiation image.

Reference numeral 30 represents a sweep control circuit which controls the deflection scanning of the electron beam, while sending synchronizing signal to the data processor 28.

Several kinds of radiation image processing by the processor 28 are well known, as previously described. A reconstructed image made in this manner is displayed by an image display device 31.

It is understood that a photodiode is also available as the light detector, and that a magnetic deflector can be used for the electron beam scanning.

Figure 8:
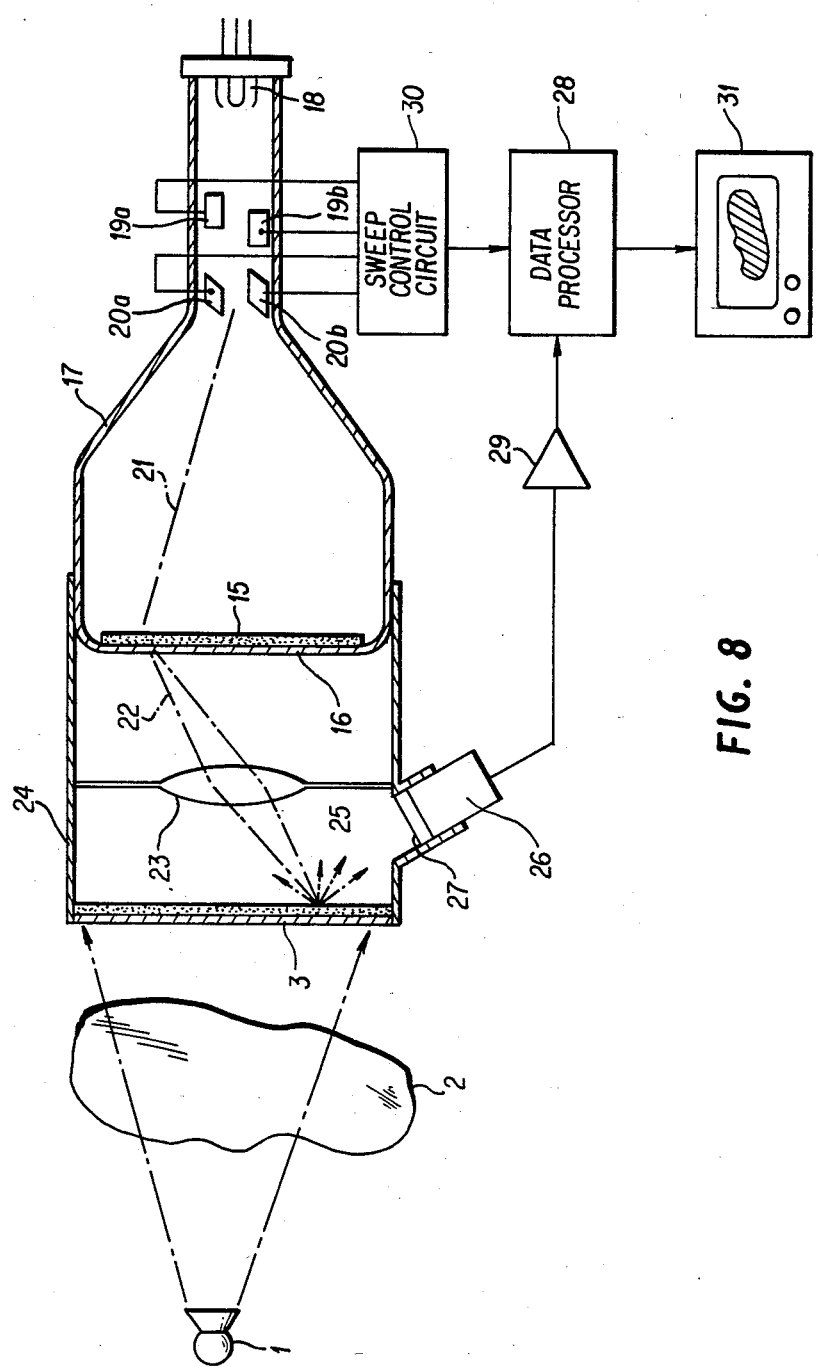
FIG. 8 is a schematic view showing the incorporation of the radiation image storage medium into the reconstruction device.

FIG. 8 shows an incorporation of the radiation image storge medium in the reconstruction device.

In FIG. 8, a radiation image storage medium 3 in which a radiation image has not been stored yet, is set up on the reconstruction apparatus. Under this condition, an object 2 is irradiated by an X-ray from an X-ray tube 1. As a result thereof, a radiation image is stored in the medium 3. As soon as the storage is finished, electron scanning is started, and the medium 3 is excited by excitation light 22 from a phosphor film 15.

In this way, by incorporating the radiation image storage and reconstruction can be successively carried out.

As described above, in the storage and reconstruction apparatus according to the present invention, scanning of the radiation image storage medium by the excitation light is carried out not by using a mechanical scanning means, but by using a electrical scanning means. As a result thereof, the necessary time period for reconstruction of the radiation image can be reduced. Furthermore, because the radiation image storage medium can be easily incorporated into the reconstruction system, an instantaneous image processing can be carried out.

The radiation image storage and reconstruction apparatus of the present invention may be effectively applicable to the several kinds of medical diagnostic system using a radiation image processing apparatus.

Further, the term "radiation" used in the present invention includes not only X-ray, but also α-ray, β-ray and γ-ray.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A storage and reconstruction apparatus for a radiation image comprising:
   an object to be radiated;
   a radiation source;
   a radiation image storage medium being made of phosphor glass powder essentially containing Ag, P and O in which active sites are formed and a radiation image obtained by irradiation from said radiation source through said object, wherein said phosphor glass powder contains the following range of weight precents: Ag, 0.2–7,4; P, 27.2–34.5; and O, 42.2–53.7;
   a light beam source emitting a light beam having a wavelength component effective to excite said radiation image storage medium;
   a scanning means for scanning said radiation image storage medium by said light beam emitted from said light beam source in order to produce a fluorescent light;
   a light detecting means for detecting said fluorescent light emitted from said radiation image storage medium and generating an electrical output signal; and
   an image processing means for processing said output signal generated from said light detecting means to reconstruct said radiation image.

2. A storage and reconstruction apparatus for a radiation image according to claim 1, wherein said radiation image storage medium comrpises a substrate on which said phosphor glass powder is deposited.

3. A storage and reconstruction apparatus for radiation image according to claim 1, wherein said phosphor glass powder comprises Ag, P and O.

4. A storage and reconstruction apparatus for a radiation image according to claim 1, wherein the diameter of the glass of said glass powder is between 5 μm and 500 μm, and the thickness of the layer of said glass powder is less than 1 mm.

5. A storage and reconstruction apparatus for a radiation image according to claim 2, wherein said substrate is made of nickel plate.

6. A storage and reconstruction apparatus for radiation image comprising:
   an object to be radiated;
   a radiation source;
   a radiation image storage medium being made of phosphor glass powder in which active sites are formed according to a radiation image obtained by irradiation from said radiation source through said object;
   a light beam source emitting a light beam having a wavelength component effective to excite said radiation image storage medium;
   a scanning means for scanning said radiation image storage medium by said light beam emitted from said light beam source in order to produce a fluorescent light;
   a light detecting means for detecting said fluorescent light emitted from said radiation image storage medium and generating an electrical output signal; and
   an image processing means for processing said output signal generated from said light detecting means to reconstruct said radiation image, wherein said light beam source is a phosphor film formed inside of a face place of a cathode ray tube, and said scanning means is an optical lens for condensing the light emitted from said phosphor film according to the electron beam scanning in said cathode ray tube and irradiating the condensed light into said radiation image storage means.

7. A storage and reconstruction apparatus for a radiation image according to claim 1, wherein said light detecting means is a photo multiplier.

8. A storage and reconstruction apparatus for a radiation image comprising:
   an object to be radiated;
   a radiation source;
   a radiation image storage medium for forming active sites corresponding to a radiation image obtained by irradiation from said radiation source through said object;
   a cathode ray tube;
   a phosphor film being arranged at the rear of said radiation image storage medium and being formed inside of a face plate of said cathode ray tube;
   a light focusing means being arranged between said radiation image storage medium and said phosphor film to focus the light emitted from said phosphor film according to the electron beam scanning in said cathode ray tube and to project the focused light beam into said radiation image storage medium;
   a light detecting means for detecting the light emitted from said radiation image storage medium and generating an electrical output signal;
   an optical filter being arranged in front of said light detecting means to pass only the light emitted from said radiation image storage medium; and
   an image processing means for processing said output signal generated from said light detecting means to reconstruct said radiation image.

9. A storage and reconstruction apparatus for radiation image according to claim 8, wherein the main composition of said phosphor film is $Ca_2Mg.Si_2O_7[Ge]$.

10. A storage and reconstruction apparatus for radiation image according to claim 8, wherein said light detecting means is a photo multiplier.

11. A storage and reconstruction apparatus for a radiation image according to claim 6, wherein said radiation image storage medium comprises a substrate on which said phosphor glass powder is deposited.

12. A storage and reconstruction apparatus for a radiation image according to claim 6, wherein the diameter of the glass of said glass powder is between 5 μm and 500 μm, and the thickness of the layer of said glass powder is less than 1 mm.

13. A storage and reconstruction apparatus for a radiation image according to claim 11, wherein said substrate is made of nickel plate.

14. A storage and reconstruction apparatus for a radiation image according to claim 6, wherein said light detecting means is a photo multiplier.

* * * * *